Figure 1:
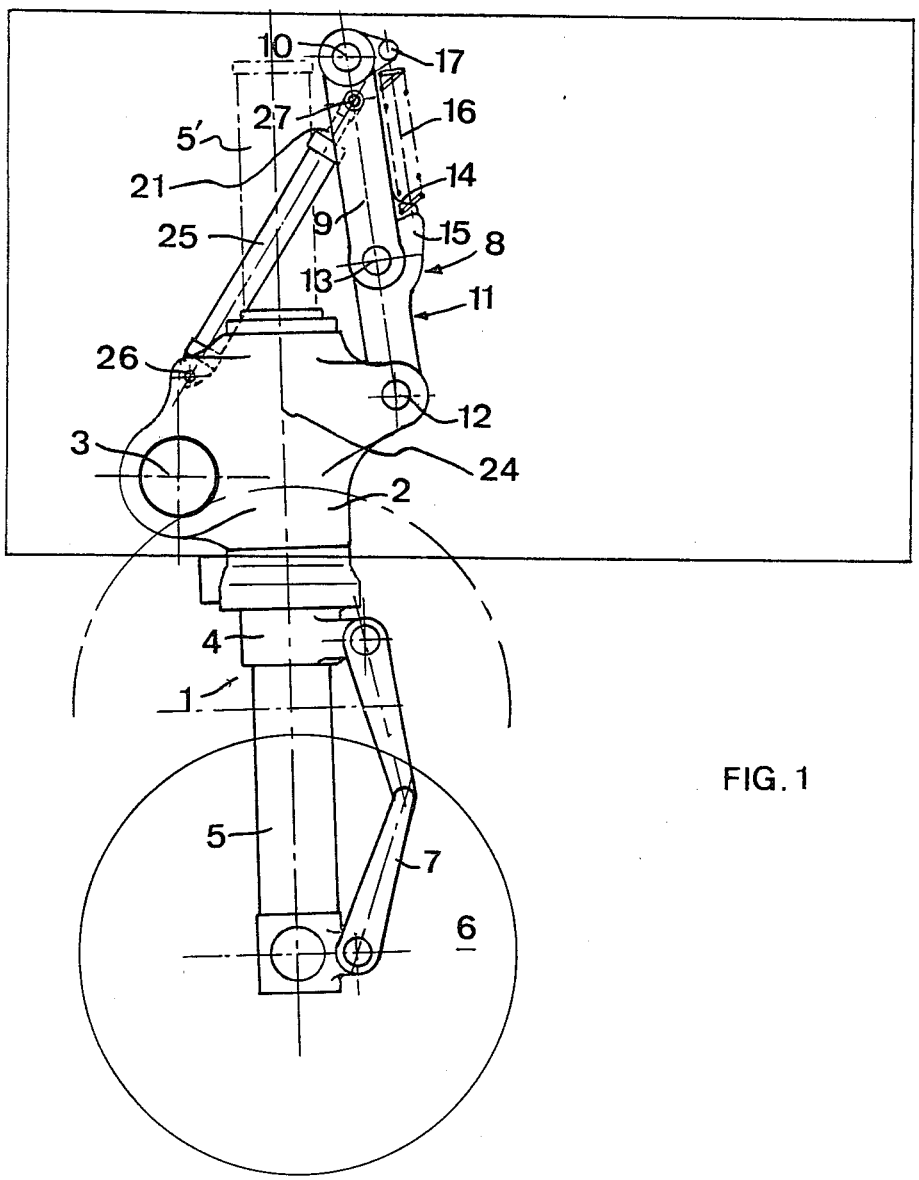

United States Patent [19]

Masclet et al.

[11] 4,355,773
[45] Oct. 26, 1982

[54] RETRACTABLE RUNNING GEAR FOR VEHICLE

[75] Inventors: Jean Masclet, Paris; André Turiot, Normandie-Niemen, both of France

[73] Assignee: Messier-Hispano-Bugatti (SA), Montrouge, France

[21] Appl. No.: 176,498

[22] Filed: Aug. 8, 1980

[30] Foreign Application Priority Data

Sep. 13, 1979 [FR] France .................................. 79 22926
Jun. 27, 1980 [FR] France .................................. 80 14312

[51] Int. Cl.$^3$ ........................ B64C 25/10; B64C 25/26
[52] U.S. Cl. ............................ 244/102 R; 244/102 SL
[58] Field of Search ......... 244/102 R, 102 SL, 100 R, 244/104 R

[56] References Cited

U.S. PATENT DOCUMENTS

| | | | |
|---|---|---|---|
| 2,487,598 | 11/1949 | Saulnier | 244/102 R |
| 2,529,401 | 11/1950 | Lawson | 244/102 SL |
| 2,562,778 | 7/1951 | Egly | 244/102 SL |
| 2,959,381 | 11/1960 | Hartel | 244/102 R |

FOREIGN PATENT DOCUMENTS 1333200 10/1973 United Kingdom ............ 244/102 R

*Primary Examiner*—Galen L. Barefoot
*Attorney, Agent, or Firm*—McAulay, Fields, Fisher, Goldstein & Nissen

[57] ABSTRACT

An aircraft landing gear including a leg member supporting at least one wheel, the leg having a first point of attachment around a first axis of rotation about a first point on the aircraft, a strut including a rod and a lever pivotally mounted on one another around a third axis, the rod having a second axis of rotation on a second point of attachment to the aircraft and the lever being pivoted about a fourth axis on the leg, and an operating jack applying at least one rotational torque to the strut and the leg wherein one end of the jack is connected to a third point on the leg and the other end of the jack is connected to a fourth point on the strut, the third and fourth points being located substantially near the first and second points of attachment.

9 Claims, 3 Drawing Figures

RETRACTABLE RUNNING GEAR FOR VEHICLE

This invention relates to retractable rolling apparatus and more particularly to retractable landing gears for aircraft including helicopters.

A retractable landing gear for an aircraft such as an airplane comprises a leg whose girder is articulated around a lifting axis fixed on the structure of the aircraft, and a breaking strut constituted by a rod, articulated around an axis fixed on the structure, and a lever, articulated on the girder, the rod and the lever also being articulated on one another and locked in position of alignment, in the extension of one another, under the influence of elastic means of traction fixed on the one hand on the rod and on the other hand on the lever, when the under-carriage unit is brought into "gear down" position by the retraction of an operating jack articulated on the breaking strut. Moreover, from the "gear down" position, the extension of the jack produces, first of all the unlocking of the strut by disalignment of the rod and the lever, then, simultaneously, the closure of the strut and the rotation of the girder around the lifting axis, against elastic means, into an intermediate position in which the articulation of the lever on the girder is aligned with the lifting axis and the axis of articulation of the rod on the structure, between the latter, the rotation of the girder and the opening of the strut beyond this position, produced by the jack, taking place with the assistance of the elastic means producing the locking of the undercarriage unit in "gear up" position, while insuring the locking of the strut by realignment of the rod and the lever with the assistance of the jack, while the retraction of the jack from the "gear up" position produces, symmetrically, the unlocking of the strut by disalignment of the rod and the lever, then, simultaneously, the closure of the strut and the rotation of the girder around the lifting axis, against the elastic means, into the intermediate position, the rotation of the girder and the opening of the strut beyond this position, produced by the jack, taking place with the assistance of the elastic means, which produce the locking of the undercarriage unit in "gear down" position, while insuring the locking of the strut by realignment of the rod and the lever, with the assistance of the jack.

In the known gear described above, the jack is connected, on the one hand to the strut and on the other hand to a third fixed point situated on the aircraft. In view of the particular structure of the strut and of the wheel leg which are fixed at two points on the aircraft, it defines a plane which passes through two points.

Owing to the stresses to which the aircraft is subjected, it can happen that this plane will undergo parasite rotations around the straight line passing through these two points.

Since the jack, by its construction, is a longitudinally rigid structure, and since it is linked to the strut and to the aircraft, it can consequently undergo parasite torsions that can block the gear in the course of its operations of extension or retraction, and in any event, damage the jack faster than it should be.

It is the object of the present invention to palliate the drawbacks mentioned above, and to embody a more compact and more reliable landing gear. The object of the present invention is a running gear for a vehicle, particularly for an aircraft, comprising:

a leg supporting at least one wheel, the leg having a first axis of rotation capable of being fixed on the vehicle at a first point, a strut comprising a rod and a lever mounted pivotally on one another around a third axis, the rod having a second axis of rotation capable of being fixed on the vehicle at a second point, and the said lever being mounted pivotally around a fourth axis on the leg.

an operating jack to apply at least one rotation torque to the strut and to the leg, characterized by the fact that it has first means of linking one end of the jack to the leg at a third point, and second means of linking the other end of the jack to the strut at a fourth point, the third and fourth points being situated substantially in the vicinity, respectively, of the first and second points.

Figure 2:
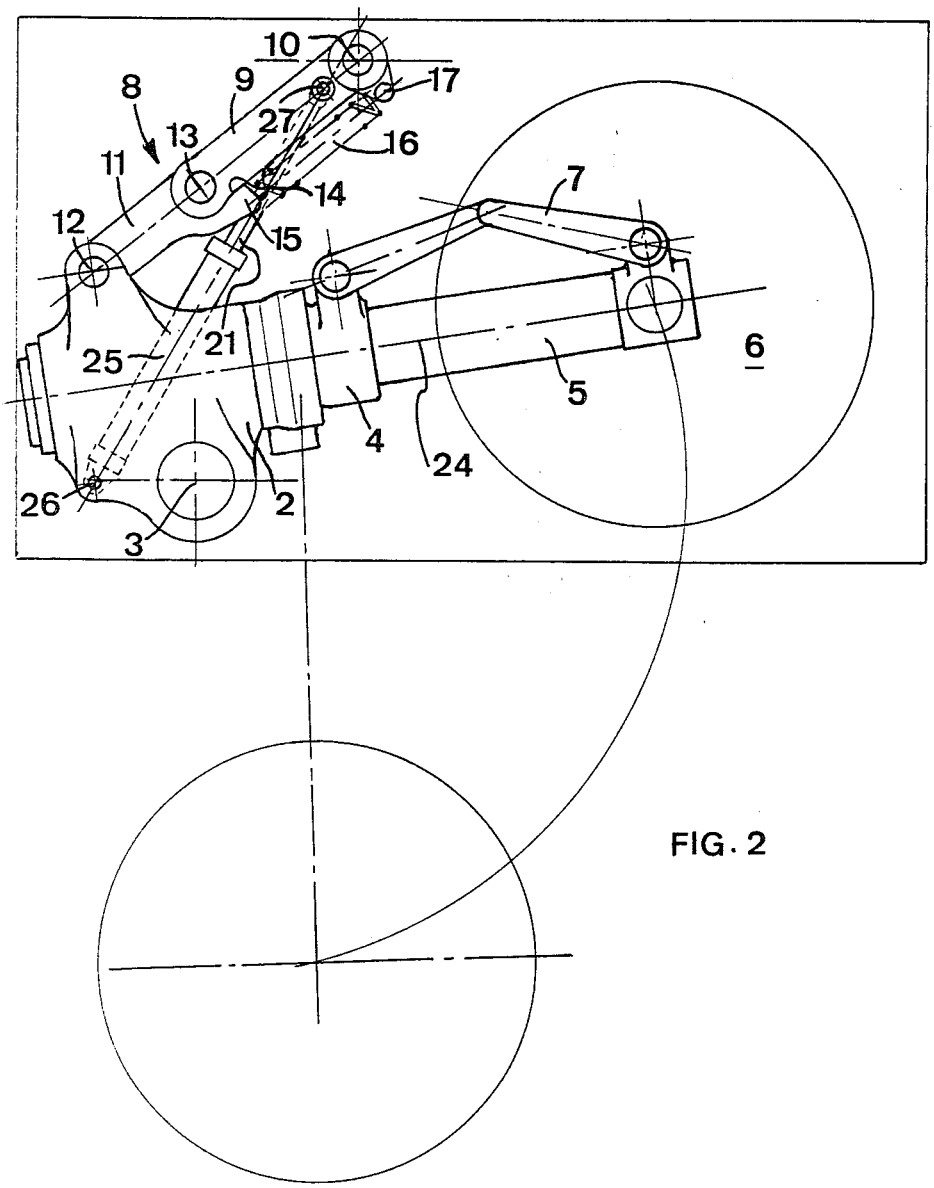
Figure 3:
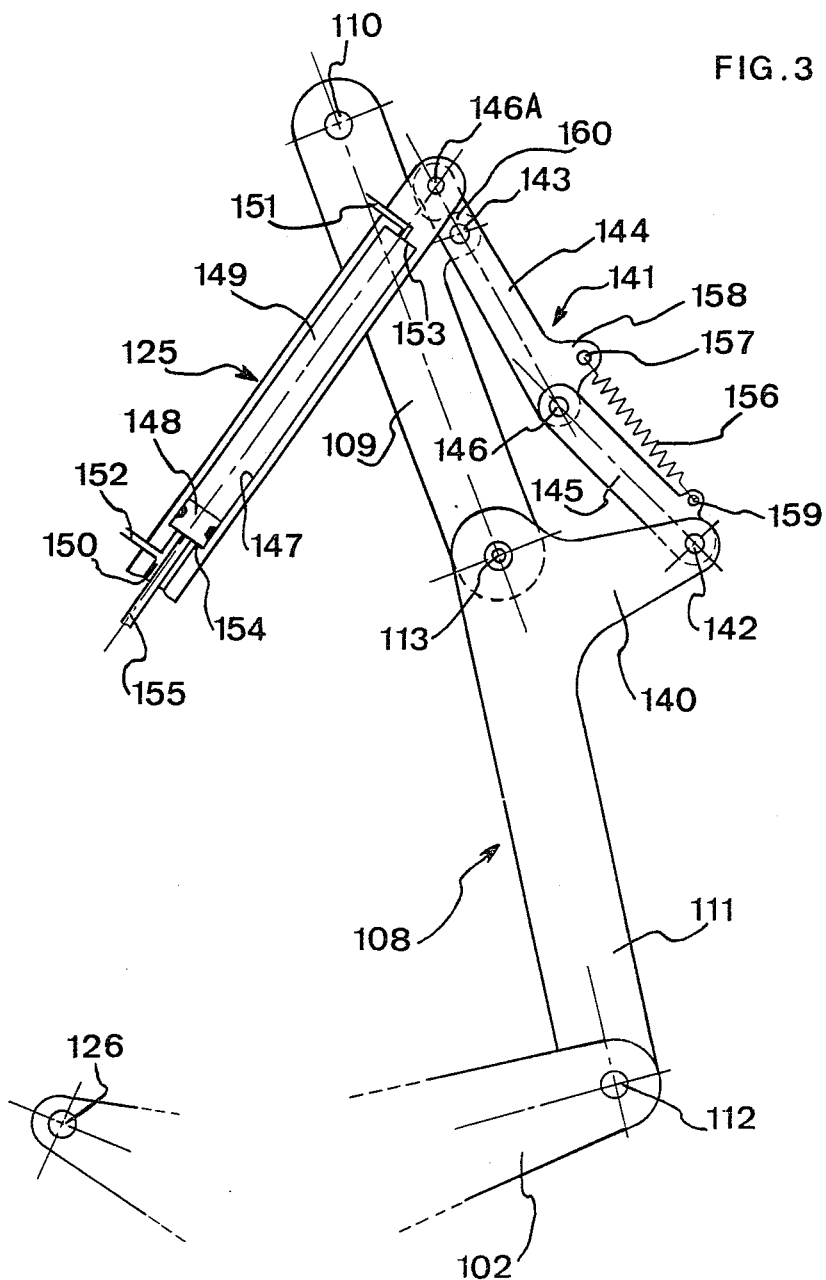

The present invention will be better understood with the aid of a particular example thereof which will be described below, by way of illustration, with reference to the attached figures in which:

FIGS. 1 and 2 represent a side view, respectively in "gear down" and "gear up" position, of one embodiment of a gear according to the invention, and FIG. 3 repesents a part of the landing gear according to another embodiment of the invention.

Referring to FIGS. 1 and 2, the undercarriage unit comprises a leg 1 constituted by a girder 2 articulated around a lifting axis 3 fixed on the structure of the aircraft, and in which a damper cylinder 4 may be mounted to swivel cylinder 4 is traversed by a damper shaft 5 bearing, at its lower end, a wheel 6, and constituting, with cylinder 4, a sliding damper such as shaft 5 which can project at 5' from the other side of cylinder 4, relative to wheel 6, when the damper is raised.

Any rotation of cylinder 4 with respect to girder 2 is transmitted to wheel 6 by calipers 7. The bracing of leg 1 in "gear down" position is insured by a strut 8 constituted by a rod 9 articulated around a fixed pivot 10 on the structure of the aircraft, and a lever 11, articulated on girder 2 around pivot 12, and on rod 9 around pivot 13. Abutting faces, one provided on rod 9 and the other on lever 11, constitute stops 14 and 15 abutting against one another when rod 9 and lever 11 are locked in position of alignment with one another or, more precisely, in a position slightly beyond the position of alignment with one another, under the influence of a traction spring 16 attached at one end to stop 15 on lever 11 and at the other end to an attachment 17 on rod 9. A jack 25 is articulated by its cylinder around pivot 26 on girder 2, and by its shaft on rod 9 around pivot 27. Since axis 27 on rod 9 is disposed on the same side as that where strut 8 is situated relative to the geometric axis defined by fixed pivots 3 and 10 in both "gear down" and "gear up" position.

Furthermore, pivots 26 and 27 are situated as close as possible to the two fixed pivots 10 and 3, on the aircraft, so that the jack will preferably be in proximity to the straight line passing through the two fixed pivots 3 and 10 so that if, in any eventuality, pivot 12 were forced to undergo parasite rotations around this axis, the jack would be only very partially affected by the latter. Of course, the two pivots 26 and 27 are situated in the gear so that it will be able to function as described below.

Since the undercarriage unit rises longitudinally to the right in FIG. 1, the pivots 3, 10, 12 and 13 are therefore perpendicular to the plane of this figure, pivot 3 being disposed forward relative to the longitudinal axis 24 of girder 2 while axes 10, 12 and 13 are disposed to the rear of this longitudinal axis 24.

As for the axis of rotation 26, it is always situated on the same side of the straight line passing through the two pivots 3 and 10, for example on the side opposite pivot 12 when the gear is in down position (FIG. 1) relative to this straight line and in the angular sector defined by the two straight lines passing, respectively, through pivots 3 and 12, on the one hand, and 27 and 12 on the other hand, when the gear is in up position (FIG. 2).

In this embodiment, pivot 27 of the jack is situated directly on strut 8 and more particularly on rod 9, but it is quite clear that the latter can be, for example, connected to this strut 8 by any means able to transmit to it the force that is exerted at the end of the jack linked to pivot 27. More precisely, the gear works in the following manner, when it passes from one of the two positions, up and down, to the other.

Thus, when the jack is extended, i.e. when shaft 21 is moved out from the "gear down" position, in which shaft 21 is retracted, a moment of rotation is exerted on rod 9, around pivot 10 in the direction of disalignment of rod 9 and the first lever 11, i.e., in the case of the figure, in the counterclockwise direction against spring 16.

Jack 25 thus produces the unlocking of strut 8, then the lifting of the undercarriage unit around lifting pivot 3, pivot 12 being raised by the torque effect around axis 3 and the force exerted at 26.

The lifting takes place against springs 16, up to an intermediate position, in which pivot 13 is aligned with fixed pivots 3 and 10 and between the latter.

Beyond this position, the lifting takes place under the urging of springs 16 and the force of the jack, the strut having ceased to close in the intermediate position, and opening beyond the latter, and is again unfolded and locked in aligned position, or slightly beyond the aligned position, under the influence of springs 16. With the assistance of jack 25, when the undercarriage unit reaches "gear up" position, as represented in FIG. 2.

In this position, the axis of the jack intersects the geometric axis defined by pivots 3 and 12, and that strut 8 has shifted to the other side of the geometric pivots defined by axes 3 and 10, relative to the position occupied in "gear down" position. The undercarriage unit therefore occupies stable positions when it is locked up or down.

From the "gear up" position, if the retraction of jack 25 is produced, i.e. the return of shaft 21 into the jack cylinder, counter forces are exerted on rod 9 which rotates counterclockwise around pivots 10, to obtain the disalignment of rod 9 and lever 11, i.e. in the direction of the movement of strut 8 against spring 16. Jack 25 thus produces the unlocking of strut 8 then the descent of the undercarriage unit around pivot 3 by a torque effect on this pivot. This descent is executed as far as the intermediate position of the strut which continues to incline, then becomes realigned as shown in FIG. 1. Finally, it should be noted that the up and down positions of the gear are perfectly defined, and, moreover, maintained by the urging of spring 16 and the cooperation of the surfaces of abutment 14 and 15 when they are resting on one another.

This abutment provides good results in the majority of cases but, on the contrary, under very severe conditions of use, it can have a drawback.

As a matter of fact, in very cold countries, ice can form between the rod and the extension of the lever, thereby preventing the obtention of the desired position with the risks of a possible unlocking of the gear from one of its two positions.

The embodiment illustrated in FIG. 3 is intended to improve the gear according to FIGS. 1 and 2, and in particular to embody a retractable landing gear with no outside positioning stop.

FIG. 3 represents, essentially, the main strut of the landing gear with its locking means in a position which can be that of the gear when down.

The part of the gear therefore comprises a strut 108 formed of a rod 109 fixed at one end to a rotary pivot 110 integral with the frame of the aircraft, and at its other end, rotatably around pivot 113 on one end of a lever 111 whose other end is mounted rotatably around pivot 112 on a leg 102.

Lever 111 has, substantially at the level of pivot 113, an eccentric projection 140 bearing an arm 141, whose one end is mounted rotatably around pivot 142 on this projection, and whose other end is mounted rotatably on rod 109 around pivot 143. The length of arm 141 is determined at a certain value, and the three pivots 141, 143 and 113 are situated substantially at the apices of a triangle that can be deformable. Arm 141 is formed of two links 144 and 145 connected substantially in their center, around a rotary axis 146 to be able to pivot relative to one another, the other ends of these two elements being connected respectively to pivots 143 and 142.

In this embodiment, link 144 extends, with an extension 160, slightly beyond pivot 143, and bears pivot 146A, around which moves the end of an operating jack 125 which, in its two positions will enable the gear to be retracted or extended.

This jack is constituted, very schematically, by a cylinder 147 in which there can move a piston 148, delimiting two chambers of variable volume, 149 and 150, with their supply of fluid under pressure, respectively, through ducts 151 and 152. It is noteworthy that this jack is designed so that its length will have a predetermined value such that the two ends 153 and 154 constitute stops for piston 148, and thus limits its displacement.

Of course, the projecting shaft 155 of jack 125 can be connected, according to cases, directly or indirectly to leg 102 sketched in the figure.

And finally, the two links 144 and 145 are subjected to the action of a spring 156 supported at 157 on an eccentric portion 158 of link 144 and on link 145 at a point 159, so that the two points 157, 159 and pivot 146 will be situated on a triangle.

This embodiment of the invention works as follows.

Assuming that the figure represents the part of the gear when it is in extended position. To retract it, the jack is actuated, tending to obtain its retracted position, i.e. when the piston moves toward base 153.

In this case, the jack exerts a traction on pivot 146A and destroys the approximate alignment 143, 146 and 142, obtaining, in this case of the figure, a rotation counterclockwise for link 144 around the pivots, and clockwise for the other link 145 around pivot 142. These movements exert traction on 142 toward pivot 110. The result of this is also the destruction of the approximate alignment of pivots 110, 113 and 112, obtaining a rotation counterclockwise for rod 109 around pivot 110, and clockwise for lever 111 around pivot 112. The latter two rotations then result in the application of a force of traction on pivot 112 toward pivot 110. Since this pivot 110 is fixed on the aircraft, this traction will cause leg 102 to rotate on its fixed axis 126 situated on the aircraft.

It will be easy to understand that when piston 154 arrives at end 153, the gear will be fully retracted, and strut 108 will assume the same configuration as that represented in the figure, but in a symmetrical position relative to straight line passing through pivot 110 and the other fixed pivot 126.

It is noteworthy that, as a matter of act, the figure represents with some exaggeration, on the one hand pivots 110, 113 and 112, and on the other hand, pivots 143, 146 and 142, as not being exactly aligned.

This configuration allows positions, for strut 108 and arm 141, respectively that are more stable, spring 156 acting, in particular on the two links 144 and 145 to maintain the slight disalignment of the arm formed by the two links 144 and 145.

Finally, assume now that the gear is brought into its extended position, achieving the configuration represented in the figure.

In this position, piston 148 of jack 125 moves toward base 154 of chamber 150. When the piston reaches this position, in abutment, the arm assumes the configuration represented, and, moreover, since the piston is in abutment in the jack, the arm can be deformed no further. This stop therefore makes it impossible, when retracting the gear, to obtain a break other than that defined above, i.e. counterclockwise and clockwise rotations respectively, for links 144 and 145. And finally, it is possible to understand the part played by the two links 144 and 145 when they are approximately in alignment, the distance separating pivots 143 and 142 is maximum, since moreover, the distances separating pivots 142 and 113 on the one hand, and 143 and 133 on the other hand, are fixed and constant, when lever 111 has accomplished its clockwise rotation relative to pivot 113, it will have reached its final position when the distance 143, 142 will be maximal (or approximately so) preventing any other supplementary rotation. It will thus be understood that arm 141 (formed of two links) constitutes a means of positioning the lever relative to the rod, providing the same results as a stop, but without its drawbacks.

Naturally, the embodiment described here is only one of several possible ones. Thus by adapting strut 108 and arm 141, it is possible to connect jack 125 on link 141 between pivots 143 and 146 or on link 145 between axes 146 and 142 or, beyond pivots 142 relative to pivots 146.

Advantageously, since the jack must act simultaneously on the arm (or the links) and the strut in order to obtain two simultaneous rotations in reverse direction, it is preferable that the point of rotary attachment 146A of the jack on a link not be very far from the point of attachment 143 of the arm on the strut (rod 109). This, moreover, makes it possible to use just one jack to obtain all the operations of retraction and extension of the gear, as well as the locking, in particular by the slight disalignments mentioned above.

Advantageously, this jack has a very continuous uniform movement for shifting the gear from one position to the other.

What is claimed is:

1. Retractable rolling apparatus for a vehicle, in particular, an airplane or a helicopter, comprising:
   a leg member mounted at a first point of attachment on said vehicle around a first axis of rotation;
   at least one wheel secured to said leg;
   a strut including a rod adapted to be fixed on said vehicle at a second point of attachment thereon and having a second axis of rotation;
   a lever pivotally mounted on said rod around a a third axis of rotation and on said leg around a fourth axis of rotation;
   an actuating jack for simultaneously acting on said strut and said leg;
   first connecting means between one end of said jack and said leg at a third point on said leg to provide rotational torque to said leg; and
   second connecting means between the other end of said jack and a fourth point of attachment on said strut to provide rotational torque to said strut, said third and fourth points being spaced apart from said first and second points of attachment and substantially in the proximity respective of said first and second points of attachment.

2. The apparatus of claim 1, further including
means for positioning said rod and said lever relative to one another.

3. The apparatus of claim 1 or 2, wherein
said means include an arm, said arm having one end secured to a fifth point of attachment on said rod and another end fixed at a sixth point of attachment on said lever; and
said fifth and sixth points of attachment and said third axis being positioned at the apices of a deformable triangle.

4. The apparatus of claim 3, wherein
said arm comprises two links; and
said links having one end rotatably mounted on said same fourth axis and their other ends rotatably mounted around fifth and sixth axes at said fifth and sixth points of attachment, respectively.

5. The apparatus of claim 4, further including
resilient means including ends attached to said links at points of attachment; and
said points of attachment of said means and said fourth axis being located at the apices of a deforable triangle.

6. The apparatus of claim 5, wherein
said arm includes means for supporting said jack.

7. The apparatus of claim 6, wherein
said means comprise a pivot on one of said links at a seventh point of attachment different from said fifth and sixth points.

8. The apparatus of claim 7, wherein
said jack includes internal stops to limit the length of its course.

9. The apparatus of claim 3, wherein
said fourth and fifth points of attachment are merged.

* * * * *